US006974556B2

(12) United States Patent
Bemis et al.

(10) Patent No.: US 6,974,556 B2
(45) Date of Patent: Dec. 13, 2005

(54) CO-INJECTION APPARATUS FOR INJECTION MOLDING

(75) Inventors: Peter F. Bemis, Sheboygan Falls, WI (US); Steven J. Kolste, Sheboygan Falls, WI (US); Daniel Cykana, Hingham, WI (US); Stephen R. Fiacchino, Port Washington, WI (US); Michael P. O'Grady, Sheboygan Falls, WI (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 0 days.

(21) Appl. No.: 10/220,489

(22) PCT Filed: Feb. 28, 2001

(86) PCT No.: PCT/US01/06417

§ 371 (c)(1), (2), (4) Date: Nov. 1, 2002

(87) PCT Pub. No.: WO01/64419

PCT Pub. Date: Sep. 7, 2001

(65) Prior Publication Data

US 2003/0209833 A1 Nov. 13, 2003

Related U.S. Application Data

(60) Provisional application No. 60/186,163, filed on Feb. 29, 2000.

(51) Int. Cl.[7] ................................................ B29C 45/16

(52) U.S. Cl. ............................ 264/328.8; 264/328.12; 425/130; 425/562; 425/564

(58) Field of Search ......................... 264/328.8, 328.12; 425/130, 133.1, 562, 563, 564, 573; 239/486–489

(56) References Cited

U.S. PATENT DOCUMENTS

| | | | |
|---|---|---|---|
| 3,981,661 | A | 9/1976 | Taylor |
| 4,083,903 | A | 4/1978 | Gilbert et al. |
| 4,124,308 | A | 11/1978 | Sokolow |
| 4,126,291 | A | 11/1978 | Gilbert et al. |
| 4,213,751 | A | 7/1980 | Fernandez |
| 4,219,323 | A | 8/1980 | Bright et al. |
| 4,279,582 | A | 7/1981 | Osuna-Diaz |
| 4,333,629 | A | 6/1982 | Roy |
| 4,712,990 | A | 12/1987 | Kurdert et al. |
| 4,925,100 | A | 5/1990 | Kudert et al. |
| 4,934,915 | A | 6/1990 | Kudert et al. |

(Continued)

FOREIGN PATENT DOCUMENTS

| | | |
|---|---|---|
| EP | 0825008 | 2/1998 |
| EP | 0911138 | 4/1999 |
| JP | 59201834 | 11/1984 |

*Primary Examiner*—Jill L. Heitbrink
(74) *Attorney, Agent, or Firm*—Michael Best & Friedrich LLP

(57) ABSTRACT

A co-injection nozzle pin (20) having downstream and upstream ends. The nozzle pin has therein a central bore (30) including an upstream end (32) adapted to communicate with a first material and a downstream end (34) exiting at the downstream end of the pin. The nozzle pin also has an outer surface (36) including a first portion (38) having a diameter $D_1$, a second portion (40) having a diameter $D_2$, wherein $D_2$ is less than $D_1$ and the first portion is rearward of the second portion. The pin further includes a channel (46) spiralling around the outer surface and being adapted to communicate with a second material. The channel (46) includes a first segment (52) defined in the first portion (38) of the outer surface and increasing in depth as it travels in a downstream direction and a second segment (54) defined in the second portion (40) of the outer surface and decreasing in depth as it travels in a downstream direction.

13 Claims, 4 Drawing Sheets

U.S. PATENT DOCUMENTS

| | | | |
|---|---|---|---|
| 4,946,365 | A | 8/1990 | Kudert et al. |
| 4,950,143 | A | 8/1990 | Krishnakumar et al. |
| 5,028,226 | A | 7/1991 | De'ath et al. |
| 5,037,285 | A | 8/1991 | Kudert et al. |
| 5,040,963 | A | 8/1991 | Beck et al. |
| 5,221,507 | A | 6/1993 | Beck et al. |
| 5,443,378 | A | 8/1995 | Jaroschek et al. |
| 5,523,045 | A | 6/1996 | Kudert et al. |
| 5,552,105 | A | 9/1996 | Konefal |
| 5,601,774 | A | 2/1997 | Schmidt et al. |
| 5,650,178 | A | 7/1997 | Bemis et al. |
| 5,662,945 | A | 9/1997 | Konefal |
| 5,891,381 | A | 4/1999 | Bemis et al. |
| 5,916,605 | A | 6/1999 | Swenson et al. |
| 5,968,558 | A | 10/1999 | Kudert et al. |
| 5,972,258 | A | 10/1999 | Sicilia |
| 5,975,871 | A | 11/1999 | Kudert et al. |
| 6,007,108 | A | 12/1999 | Braun |
| 6,062,840 | A | 5/2000 | Lee |
| 6,089,468 | A | 7/2000 | Bouti |

CO-INJECTION APPARATUS FOR INJECTION MOLDING

CROSS-REFERENCE TO RELATED APPLICATIONS

This application claims priority under 35 U.S.C. § 119 to provisional patent application No. 60/186,163 filed Feb. 29, 2000.

FIELD OF THE INVENTION

The invention relates to an injection molding apparatus, and more particularly, to co-injection apparatuses and methods for injecting different materials into a single or multi-cavity mold cavity.

BACKGROUND OF THE INVENTION

The invention relates to a nozzle pin used in co-injection apparatuses and methods. A co-injection apparatus injects two different materials, typically an inner-core material and an outer-skin material, into a mold cavity.

A co-injection manifold receives material, usually plastic, from two different injection units and combines the two materials into a single stream that flows into a mold or die. The co-injection manifold, and the co-injection nozzle housed therein, are located between injection units and the single or multi-cavity mold cavity. A typical co-injection manifold is fixed to the injection units or is located within the mold itself.

In order to produce end-products having high structural integrity, it is desirable that a uniform, even flow of each material be distributed into the mold cavity. In other co-injection methods and apparatuses, nozzle pins have been employed to facilitate the even flow of the materials, and more particularly the outer skin material. But often knit or weld lines (i.e. lines of intersection between materials) develop when using these conventional apparatuses and methods, thereby resulting in non-uniform distribution of the materials and ultimately, structural problems in the end-products. Knit lines also produce color streaking in end-products. As a result, co-injection methods and apparatuses that eliminate knit lines and uneven flow of co-injection materials are desirable.

SUMMARY OF THE INVENTION

The invention provides improved co-injection nozzle pins, apparatuses and methods for using the same.

Accordingly, the invention provides a co-injection nozzle pin having downstream and upstream ends. The nozzle pin has therein a central bore including an upstream end adapted to communicate with a first material and a downstream end exiting at the downstream end of the pin. The nozzle pin also has an outer surface including a first portion having a diameter $D_1$, a second portion having a diameter $D_2$, wherein $D_2$ is less than $D_1$ and the first portion is rearward of the second portion. The pin further includes a channel spiraling around the outer surface and being adapted to communicate with a second material. The channel includes a first segment defined in the first portion of the outer surface and increasing in depth as it travels in a downstream direction and a second segment defined in the second portion of the outer surface and decreasing in depth as it travels in a downstream direction. The second segment is in communication with and downstream from the first segment. The pin also includes a width that is substantially the same distance throughout the channel.

The invention also provides a co-injection molding apparatus comprising a co-injection manifold including a nozzle housing having an inner surface defining a chamber and an outlet. The apparatus also includes a co-injection nozzle pin having downstream and upstream ends. The nozzle pin has therein a central bore including an upstream end adapted to communicate with a first material and a downstream end exiting at the downstream end of the pin. The nozzle pin has an outer surface including a first portion, a second portion and a channel spiraling around the outer surface. The first portion is upstream of the second portion and the channel has a first segment defined in the first portion and a second segment defined in the second portion. The channel is adapted to communicate with a second material. The nozzle pin is housed in the nozzle housing such that the first portion and the first segment form a tight fit with the inner surface of the nozzle housing and the second portion and the second segment form a passageway with the inner surface that communicates with the outlet.

The invention further provides a method of co-injection molding. The method includes providing a co-injection apparatus attached to a mold defining a mold cavity. The apparatus has a manifold including a nozzle housing having an inner surface defining a chamber and the mold cavity is in communication with the nozzle housing. A co-injection nozzle pin having downstream and upstream ends is housed in the nozzle housing. The nozzle pin has therein a central bore including an upstream end adapted to communicate with a first material and a downstream end exiting at the downstream end of the pin. The nozzle pin has therein a spiraling channel in communication with a second material. The channel has a depth, a width, a first segment traveling axially and circumferentially in a downstream direction and a second segment traveling axially and circumferentially in a downstream direction. The second segment is in communication with and downstream from the first segment and the width of the channel is substantially the same distance throughout the channel. The flow of the second material is controlled through the channel and into the mold cavity, whereby substantially all of the second material entering the channel is forced to flow through the first segment until entering the second segment where at least a portion of the second material leaks out of the channel and along the second portion toward the forward end of the pin and into the mold cavity. The flow of the first material is controlled through the upstream end of the bore and out the downstream end of the bore and into the mold cavity.

BRIEF DESCRIPTION OF THE DRAWINGS

FIG. 9 is a top plan view, partially in section, of an injection molding apparatus embodying the invention.

Figure 1:
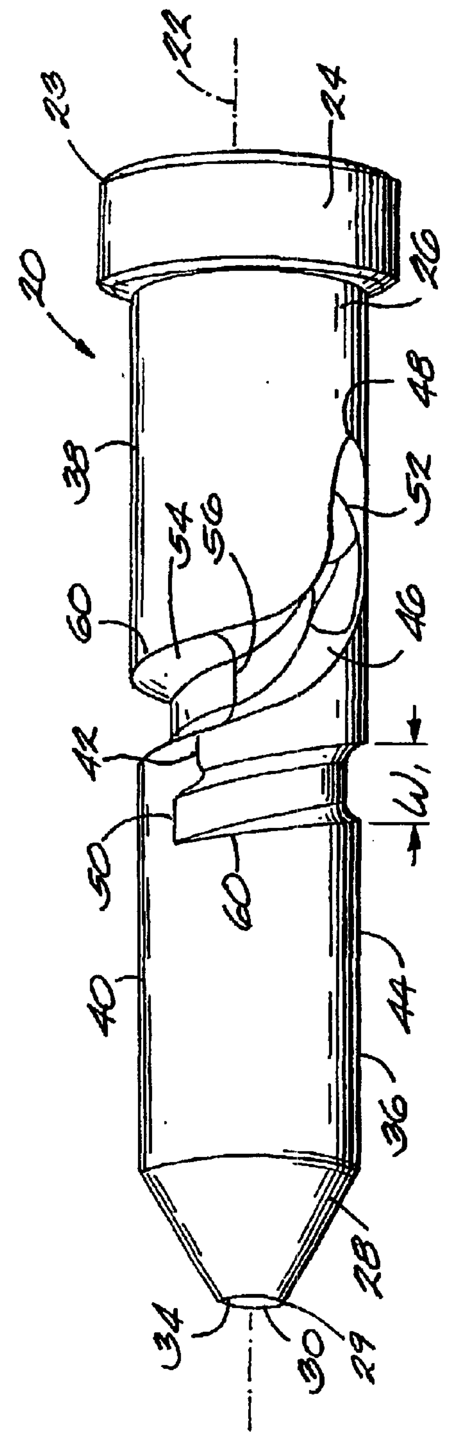
FIG. 1 is a perspective view of a nozzle pin embodying the invention.

Before the embodiments of the invention are explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

With reference to FIGS. 1–10, a nozzle pin 20 embodying the invention is shown. The pin 20 is utilized as part of a co-injection apparatus comprising a co-injection manifold, such as the manifold 130 shown and described in U.S. Pat. No. 5,650,178, hereafter referred to as the '178 patent, which issued to Bemis et al. on Jul. 22, 1997, and which is hereby incorporated by reference. The subject matter of the provisional application No. 60/186,163 filed Feb. 29, 2000 to which this application claims priority is also incorporated by reference. The apparatus described therein and below is just one example of an apparatus in which the nozzle pin 20 can be used. Use of the nozzle pin is not limited to the apparatus described below. The pin 20 of the present invention is designed to be used in place of the nozzle member 116 of the '178 patent.

The injection molding apparatus 110 (see FIG. 9) comprises a platen 114. A mold or die 122 is fixed to the platen 114. Any suitable means can be used to secure the die 122 to the platen 114. The die 122 defines a mold cavity having an inlet 126.

The apparatus 110 also comprises (see FIG. 9) the co-injection manifold 130 mounted relative to the platen 114. The co-injection manifold 130 comprises a nozzle housing 134 having forward and rearward ends. While the illustrated housing 134 includes four portions 138, 142, 146 and 150 fixed together, it should be understood that the housing 134 can be made of any number of portions or a single portion. The nozzle housing 134 is generally shaped and includes angularly spaced first and second or right and left arms 154 and 158. Each arm has a rearward end 162 and includes an outwardly extending mounting portion 166. The nozzle housing 134 has an outlet 170 in its forward end, a first inlet 174 in the rearward end of the first arm 154, and a second inlet 178 in the rearward end of the second arm 158. The outlet 170 is located on a horizontal axis extending from the forward to rearward. The outlet 170 communicates with a nozzle 182 that communicates with the mold cavity inlet 126. The inlets 174 and 178 communicate with injection nozzles 184 and 188 of respective injection units (not shown). In the illustrated construction, the injection nozzle 184 injects the inner core material and the nozzle 188 injects the outer skin material.

The nozzle housing 134 includes (see FIG. 10) a generally cylindrical inner surface 192 defining a bore or chamber 196 that is centered on an axis 198 and that communicates with the outlet 170. The bore 196 has a rearward upstream end (the upper end in FIG. 10) and a forward downstream end (the lower end in FIG. 10). The majority of the bore 196 has a cross-sectional area substantially greater than the cross-sectional area of the outlet 170, and the forward end of the bore 196 is frustoconical such that the bore 196 tapers down to the outlet 170. The nozzle housing 134 also defines (see FIGS. 9 and 10) a first passageway 204 communicating between the first inlet 174 and the upstream end of the cylindrical bore 196. The housing 134 also defines a second passageway 208 communicating between the second inlet 178 and the bore 196. The second passageway 208 communicates with the bore 196 through a second passageway opening 212 (see FIG. 10) located intermediate the opposite ends of the bore 196. The first passageway 204 extends in large part through the first arm 154 of the housing 134, and the second passageway 208 extends in large part through the second arm 158 of the housing 134. Both of the passageways 204 and 208, and specifically the downstream portions thereof, intersect the bore 196 at an angle of approximately thirty-five degrees. This facilitates material flow from the passageways 204 and 208 into the bore 196.

Figure 5:
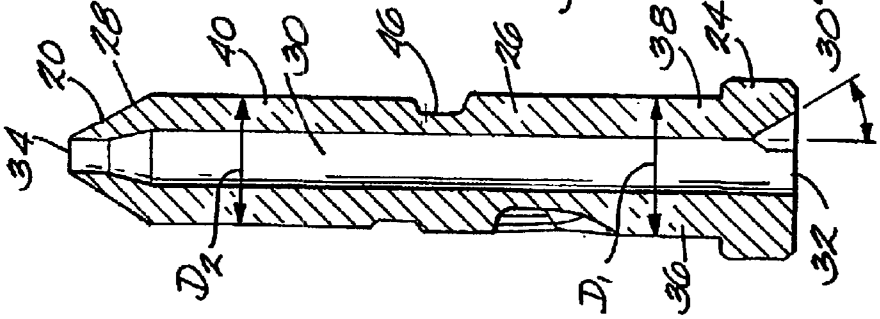
FIG. 5 is a view taken along line 5—5 of FIG. 3.
Figure 4:
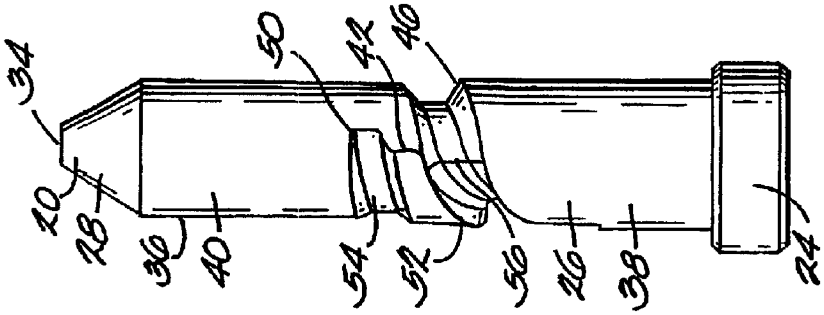
FIG. 4 is a view similar to FIG. 2 with the nozzle pin rotated 180 degrees.
Figure 3:
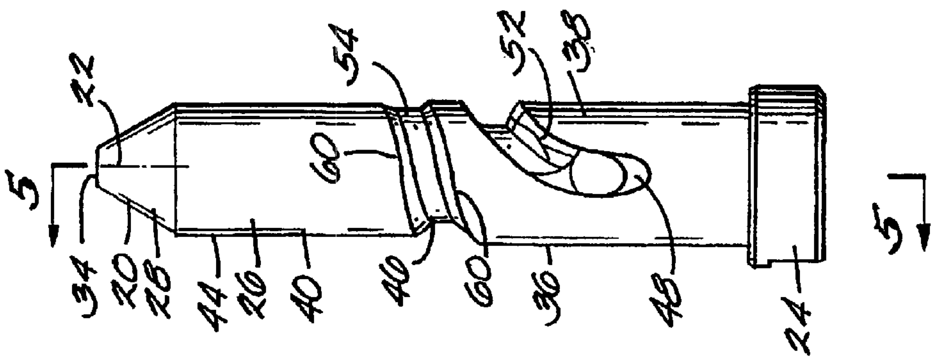
FIG. 3 is a view similar to FIG. 2 with the nozzle pin rotated 90 degrees.
Figure 2:
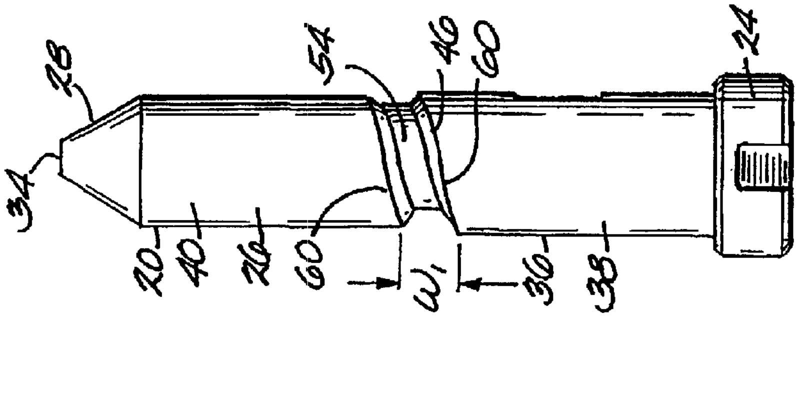
FIG. 2 is an elevational side view of the nozzle pin.
Figure 2:
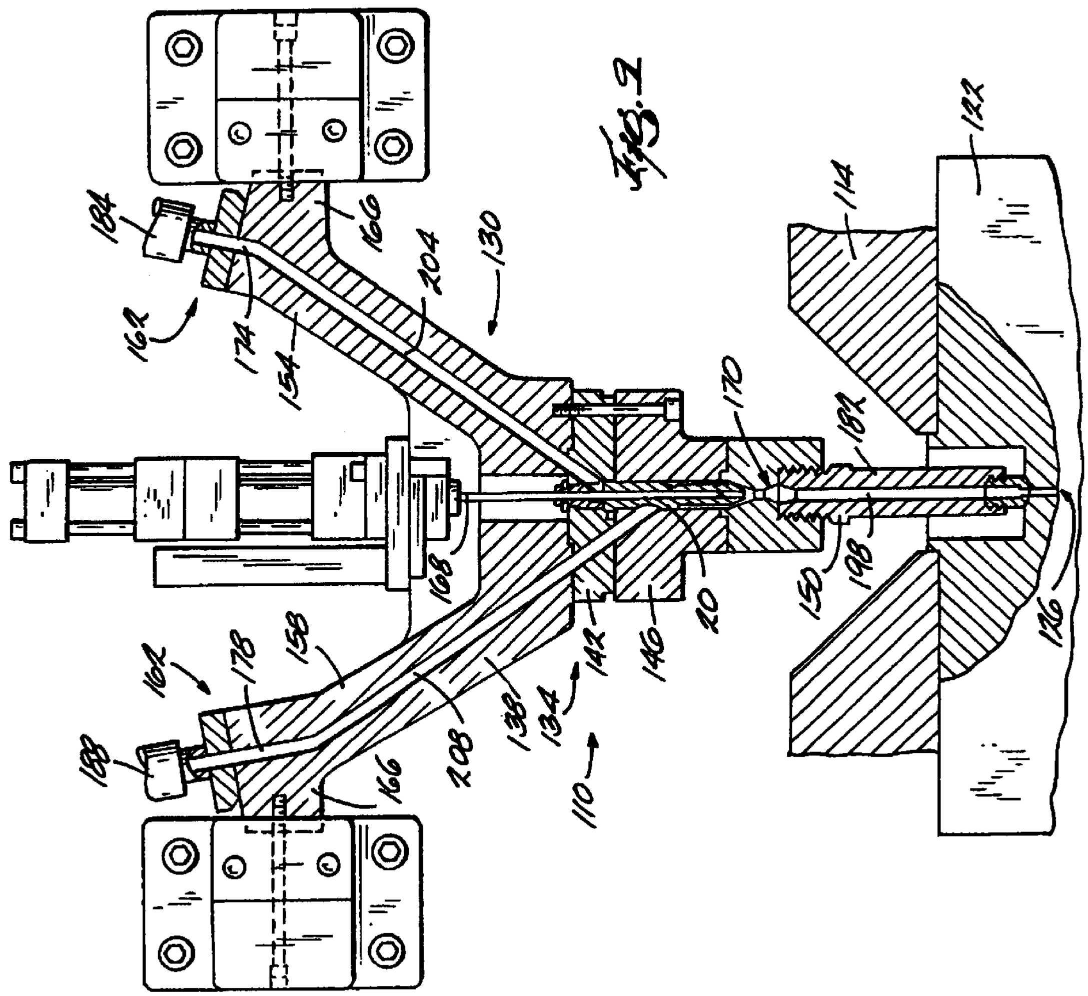
Figure 10:
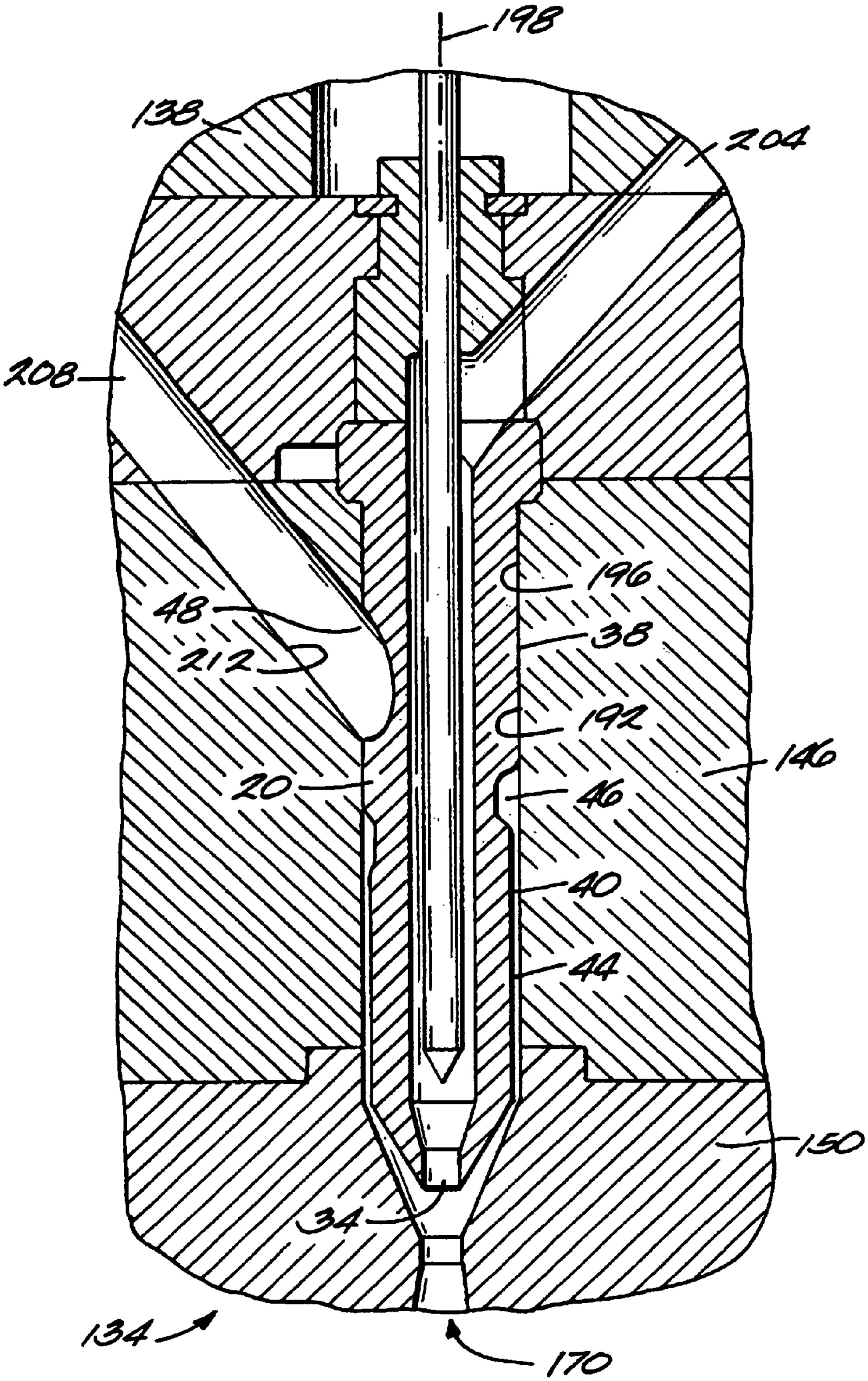
FIG. 10 is an exploded portion of FIG. 9.

The pin 20 is positioned in the manifold housing 130, such as shown in the '178 patent and FIGS. 9–10. The pin 20 is generally cylindrical having a longitudinal axis 22. In particular, the pin 209 includes an upstream end 23, a base 24, a body 26, a frustoconical tip 28 and a downstream end 29. The base 24, body 26 and tip 28 cooperate to define a central, interior, annual bore or passageway 30 aligned with the axis 22. As best shown in FIG. 5, the passageway 30 includes an entrance end 32 adjacent the base 24 and an exit and 34 adjacent the tip 28. The passageway 30 has upstream and downstream ends. The entrance end 32 is designed to be aligned with a passageway in a manifold housing of one of the injection molding materials, such as the material passageway 104 shown in the '178 patent.

The passageway 30 maintains a constant cross-sectional diameter throughout the base 24 and the body 26. Within the tip 28, the passageway 30 tapers radially inwardly toward the axis 22 at an angle and thereafter maintains a second cross-sectional diameter adjacent the exit end 34. A valve pin 198 is positionable in the passageway 30. The valve pin is conventionally moveable between three positions: a first position wherein the valve pin occludes an outlet to the manifold housing 130, such as outlet 170, and occludes the exit end 34 of the passageway 30; a second position wherein the valve pin occludes only the exit end 34 of the passageway 30; and a third position wherein the valve pin occludes neither the outlet of the manifold housing nor the exit end 34.

The body 26 of pin 20 includes a generally cylindrical wall 36. Preferably, the wall 36 includes a first portion 38 having a first diameter $D_1$ and a second portion 40 having a second diameter $D_2$, with $D_1$ being slightly larger than diameter $D_2$. For example, the difference in diameters can be 0.100". With reference to FIG. 1 in particular, a transition 42 between the first and second portions 38 and 40, respectively is best shown. When the pin 20 is positioned within the manifold housing 130, preferably the first portion 38 forms a tight fit to the manifold housing 130, and more particularly to the bore 96, such that injection molding material cannot flow between the first portion 38 and the manifold housing 130. The second portion 40, having a slightly smaller diameter $D_2$, in cooperation with the manifold housing forms a passageway 44 therebetween (see FIG. 10). The passageway 44 is annular and extends axially to the outlet of the manifold housing, and is dimensioned for example at 0.050" wide.

The pin 20 further includes an outer surface having a channel 46 defined therein. The channel 46 generally wraps and spirals around the wall 36 of the pin 20. If the channel 46 was unwrapped, so to speak, from the pin 20, the channel 46 would resemble one half of a coat hanger which had been filled by a less restrictive flow path. The channel 46 includes an entrance end 48 and an exit end 50. The entrance end 48 is adapted to be aligned with a passageway in the manifold housing carrying a first injection molding material, such as passageway 208.

The channel 46 includes a first portion or segment 52 and a second portion or segment 54. The first segment 52 is defined in the first portion 38 of the outer surface, and the second segment 54 is defined in the second portion 40 of the outer surface. The first segment 52 intersects the second segment 54 at a transition 56. The first portion 52 includes the entrance end 48. The first portion 52 travels approximately 90 degrees around the pin 20 in a first axial direction then travels in a second direction that is both axial and circumferential. But the first portion can travel more or less than the preferred 90 degrees. The depth of the channel 46 in the first portion 52 gradually deepens as it travels toward the transition 56.

Figure 8:
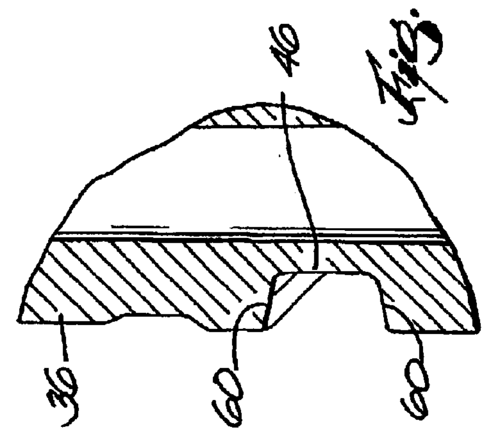
FIG. 8 is an enlarged view of a portion of FIG. 5.
Figure 7:
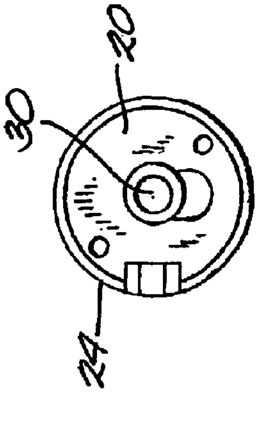
FIG. 7 is a bottom view of the nozzle pin.
Figure 6:
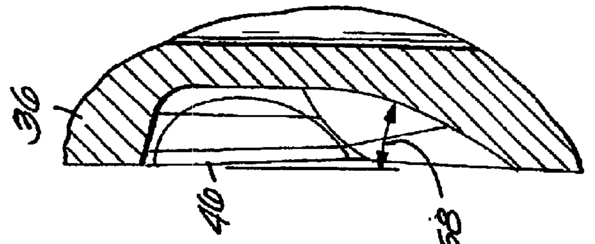
FIG. 6 is an enlarged view of a portion of FIG. 5.

The second portion 54 includes the exit end 50. The second portion 54 travels both axially as well as circumferentially along the pin 20; i.e., spirals axially around the pin 20. The spiral or pitch angle 58 of the second portion 54 is approximately 30 degrees. However, it should be noted that other angles can be used, such as between 20–70 degrees. Preferably, the second portion 54 travels at least 360 degrees around the pin 20, although other distances may be utilized. The second portion 54 includes a pair of side walls 60 at an angle of, for example, 20 degrees, as best shown in FIG. 8. Preferably, the side walls 60 maintain their spacing relative to one another, such that the width $W_1$ of the channel 46 in the second portion 54 remains constant. But the width of the channel 46 need not remain constant therethrough. In other words, the width of the channel 46 may increase or decrease or both as it travels around the pin 20. The depth of the channel 46 in the second portion 54 decreases to zero as the channel 46 travels toward the exit end 50. Generally, the distance between the tapered exit end 50 of the channel 46 and the forward end of the pin 20 is at least three times the width $W_1$ of the channel 46. A distance of at least three widths $W_1$ is preferred because it allows the second material to properly leak along the outer surface to further alleviate the formation of knit lines.

In operation, the pin 20 functions as follows. With the pin 20 positioned relative to the manifold housing as described above, a valve pin is moved from its first position to its second position. This allows a first injection molding material, such as skin material, to flow from a source and enter the channel 46 of the pin 20 at the entrance end 48. The material then flows along the first portion 52 of the channel 46. Again, when the pin 20 is positioned relative to the manifold housing, the first portion 38 of the pin preferably forms a tight fit to the manifold housing such that injection molding material, e.g. the skin material, cannot flow between the first portion 38 and the manifold housing 30. In other words, substantially all of the skin material entering the channel 46 is forced to travel through the first portion 52 to the transition 56. As the skin material flows through the first portion 52 the first portion 52 deepens.

At slightly past the transition 56, the skin material begins to flow through the second portion 54 of the channel 46. From the transition 56, the depth of the channel decreases to zero as the second portion 54 travels toward the exit end 50. The decrease in the depth of the second portion 54 creates a pressurized flow. Due to this pressurized flow, at least a portion of the skin material leaks over the side wall 60 and into the passageway 44 and toward the tip 28 of the pin 20. Again, the second portion 40 of the wall 36 has a slightly smaller diameter $D_2$ than the diameter $D_1$ of the first portion 38, thereby forming the passageway 44 between the second portion 40 and the manifold housing. A portion of the skin material also continues to travel along the second portion 54 of the channel 46 until it reaches the tapered exit end 50 of the channel 46. For example, approximately 10% of the first material leaks into the passageway 44 and the remaining 90% continues to travel along the channel 46 toward the exit end 50. It should be noted that the 10/90 percentages can be altered as desired. In any event, once the first material reaches the tapered exit end 50, the pressurized flow forces the material to leak along the second portion 40 and into the passageway 44 formed between the second portion 40 and the manifold.

The material leaks over one of the sidewalls 60 of the channel 46 and into the passageway 44 along the outer surface or second portion 40 of the wall 36 of the pin 20. The material fills the annular passageway around the entire circumference of the pin 20. Preferably, the second portion spirals greater than 360-degrees around the pin in order to prevent the formation of knit or weld lines, i.e. a line where the leaking material comes back together. The material in the passageway 44 travels axially toward the outlet of the manifold housing. The remaining material in the channel 46 travels along the remainder of the second portion 54 until at the exit end 50 it is forced to leak by the second portion 40 of the wall. The material from the second channel 54 then meets up with the material already present in the passageway 44, and the recombined stream of material then flows axially toward and then out of the manifold housing at the outlet. This arrangement provides for a uniform and even flow of the material.

After a predetermined amount of time, the valve pin 198 is moved to its third position which allows the second material, such as the core material, to flow along the passageway 30, exit the pin 20 at the exit end 34, then flow out of the manifold housing, along with the first material from the passageway 44. After another predetermined amount of time, the valve pin is moved back to its second position which allows the first material to continue to flow but stops the flow of the second material. After another predetermined amount of time, the valve pin is moved back to is first position and flow of the first and second materials from the outlet is terminated.

The pin of the present invention is particularly advantageous in that knit or weld lines, the point of intersection of the first and second materials, are minimized or eliminated. This uniform flow also provides for a more uniform distribution of the core material throughtout the part.

We claim:

1. A method of co-injection molding comprising:

providing a co-injection apparatus attached to a mold defining a mold cavity, the apparatus having a manifold including a nozzle housing having an inner surface defining a chamber, the mold cavity being in communication with the nozzle housing;

housing a co-injection nozzle pin in the nozzle housing, the nozzle pin having downstream and upstream ends, the nozzle pin having therein a central bore including an upstream end adapted to communicate with a first material and a downstream end exiting at the downstream end of the pin, the nozzle pin having therein a spiraling channel in communication with a second material, the channel having a width, a first segment increasing in depth while traveling axially and circumferentially in a downstream direction and a second segment decreasing in depth while traveling axially and circumferentially in a downstream direction, the second segment being in communication with and downstream from the first segment and the width being substantially the same distance throughout the channel;

controlling the flow of the second material through the channel and into the mold cavity, whereby substantially all of the second material entering the channel is forced to flow through the first segment until entering the second segment where at least a portion of the second material leaks out of the channel and along the second portion toward the forward end of the pin and into the mold cavity; and controlling the flow of the first material through the upstream end of the bore and out the downstream end of the bore and into the mold cavity.

2. The method of claim 1, whereby controlling the flow of the second material further comprises allowing at least a portion of the second material to continue to travel in the second segment of the channel toward a tapered end, whereupon reaching the tapered end it is forced to leak along the second portion of the pin.

3. The method of claim 1, whereby controlling the flow of the second material into the mold cavity is effectuated by allowing at least a portion of the second material to flow through the second segment of the channel more than 360 degrees.

4. The method of claim 3, whereby the second material leaks out of the channel and circumferentially around the pin, thereby preventing the formation of knit lines.

5. The method of claim 1, whereby controlling the flow of the second material through the channel and into the mold cavity is effectuated by providing the outer surface of the nozzle pin with a first portion having a diameter $D_1$ and a second portion having a diameter $D_2$, wherein $D_2$ is less than $D_1$ such that when the pin is housed in the manifold, a passageway in which material can flow is formed between the inner surface of the nozzle housing and the second portion and the second segment.

6. The method of claim 1, wherein the first portion, second portion and the inner surface of the housing defining the chamber are each substantially cylindrical.

7. A co-injection nozzle pin comprising a central bore for receiving a first material, an outer surface, and a channel spiraling around the outer surface for receiving a second material, the channel having a first segment having an increasing depth as the first segment spirals in a downstream direction and the channel having a second segment having a decreasing depth as the second segment travels in a downstream direction.

8. A co-injection nozzle pin having downstream and upstream ends, the nozzle pin having therein a central bore including an upstream end adapted to communicate with a first material and a downstream end exiting at the downstream end of the pin, the nozzle pin having an outer surface including a first portion having a diameter $D_1$;

a second portion having a diameter $D_2$wherein $D_2$ is less than $D_1$ and the first portion is rearward of the second portion; and a channel spiraling around the outer surface and being adapted to communicate with a second material, the channel including a first segment defined in the first portion of the outer surface and increasing in depth as the first segment spirals in a downstream direction;

a second segment defined in the second portion of the outer surface and decreasing in depth as the second segment travels in a downstream direction, the second segment being in communication with and downstream from the first segment; and a width, the width being substantially the same distance throughout the channel.

9. The nozzle pin of claim 8, wherein the first segment of the channel travels axially and then axially and circumferentially around the nozzle pin.

10. The nozzle pin of claim 8, wherein the second segment of the channel travels at least 360 degrees around the nozzle pin.

11. The nozzle pin of claim 8, wherein the nozzle pin is adapted to be housed within a co-injection manifold such that a passageway in which the second material can leak is formed between the second portion of the outer surface and the manifold.

12. The nozzle pin of claim 8, wherein second segment has a tapered exit end, and the distance between the tapered end and the forward end of the pin is at least three channel widths.

13. The nozzle pin of claim 8, wherein the channel is defined by walls and the walls are pitched at least 20 degrees.

* * * * *